United States Patent [19]

Skoglund

[11] Patent Number: 5,487,405
[45] Date of Patent: Jan. 30, 1996

[54] FLOW CONTROL VALVE HAVING FLOW ADJUSTABLE BY VARIABLE RING

[76] Inventor: Paul K. Skoglund, 2222 - 79th Ave. NE., Bellevue, Wash. 98004

[21] Appl. No.: 224,477

[22] Filed: Apr. 7, 1994

Related U.S. Application Data

[63] Continuation-in-part of Ser. No. 69,459, Jun. 1, 1993, Pat. No. 5,301,713.

[51] Int. Cl.$^6$ .................................................. G05D 7/01
[52] U.S. Cl. .......................................... 137/501; 137/504
[58] Field of Search ..................................... 137/501, 504

[56] References Cited

U.S. PATENT DOCUMENTS

| | | |
|---|---|---|
| 824,425 | 6/1906 | Johnson . |
| 2,093,015 | 9/1937 | Madden . |
| 2,121,936 | 6/1938 | Thomas . |
| 2,351,035 | 6/1944 | Grant . |
| 2,655,935 | 10/1953 | Kinzbach . |
| 2,699,799 | 1/1955 | Wager . |
| 2,704,553 | 3/1955 | Vertevil . |
| 2,865,397 | 12/1958 | Chenault ............................ 137/501 X |
| 3,122,162 | 2/1964 | Sands . |
| 3,433,262 | 3/1969 | Ray . |
| 3,446,227 | 5/1969 | Grayson . |
| 3,478,776 | 11/1969 | Royer . |
| 3,503,417 | 3/1970 | Toda . |

(List continued on next page.)

FOREIGN PATENT DOCUMENTS

| | | |
|---|---|---|
| 444950 | 3/1963 | Japan . |
| 772626 | 2/1978 | South Africa . |
| 1228079 | 4/1971 | United Kingdom .................... 137/501 |

OTHER PUBLICATIONS

"A Novel Approach to Flow Control for Chemical Injection and Continous Sampling", M. S. Shelton, Society of Petroleum Engineers Publication No. 16910, pp. 329–338, Sep., 1987.

"Automatic Flow Rate Controllers", Kates Company, a Taub Company. (Undated).
"Primary Secondary Pumping Manual", ITT. (Undated).
"Variable Speed/Variable Volume Pumping Fundamentals", ITT (Undated).
"A Chilling Story of the Bridge", BRDG–TNDR Corp. (Undated).
"Design ED, EAD and EDR Control Valve Bodies", Fisher Corp. (Undated).
"Flow Control", Westinghouse (Undated).
"Air Handling Unit–Coil Piping 3–Way Valve Control". (Undated).
"Specification Sheet No. 428DP–CP", Bailey (Undated).
"Two–Way Valve Cast Iron Flanged", Sauter (Undated).

Primary Examiner—Robert G. Nilson
Attorney, Agent, or Firm—Graybeal Jackson Haley & Johnson

[57] ABSTRACT

A constant flow rate controller valve includes a piston spring biased towards the top of the valve. Fluid or gas flowing into the valve increases the forces in the chamber above the piston, forcing the piston toward a valve seat. The piston is thus seated in the valve seat, blocking gas or fluid flow to the outlet port. The forces on the piston in the chamber below the piston builds as flow goes through the piston until the forces in this chamber including the piston spring force is greater than the forces in the chamber above the piston. The piston then is lifted from the valve seat, and the pathway to the outlet orifice is opened. At equilibrium, fluid or gas flows through or around the piston via the variable orifice. The equilibrium flow rate can be altered through variation of fluid flow through the piston orifice and/or around the piston by a bladder ring which is inflated or deflated, by an elastomeric ring which is compressed by liquid or structural forces, or by a metal or plastic ring that is circumferentially variable by mechanical actuators. Change in the fluid flow through the piston orifice or around the piston alters the flow resistance, $C_v$. The piston thus moves to an equilibrium position based on the altered flow rate Q.

18 Claims, 11 Drawing Sheets

U.S. PATENT DOCUMENTS

| | | |
|---|---|---|
| 3,593,742 | 7/1971 | Taylor . |
| 3,643,685 | 2/1972 | Hays .................................. 137/501 X |
| 3,729,018 | 4/1973 | Butterfield . |
| 3,741,242 | 6/1973 | Hansen et al. . |
| 3,872,884 | 3/1975 | Busdiecker . |
| 3,958,596 | 5/1976 | Garrard . |
| 4,016,905 | 4/1977 | Marlatt, Sr. . |
| 4,074,693 | 2/1978 | Kates . |
| 4,080,993 | 3/1978 | Lind . |
| 4,092,998 | 6/1978 | Taplin . |
| 4,098,285 | 7/1978 | Karing . |
| 4,168,719 | 9/1979 | Renshaw . |
| 4,175,584 | 11/1979 | Rikuta . |
| 4,230,147 | 10/1980 | Booth et al. . |
| 4,250,914 | 2/1981 | Ferrentino . |
| 4,508,140 | 4/1985 | Harrison . |
| 4,541,454 | 9/1985 | Sturman et al. . |
| 4,893,649 | 1/1990 | Skoglund . |
| 5,004,008 | 4/1991 | Drucker . |
| 5,022,438 | 6/1991 | Faraon-Chaul . |
| 5,054,516 | 10/1991 | Okerblom . |
| 5,101,854 | 4/1992 | Bron ....................................... 137/501 |
| 5,143,116 | 9/1992 | Skoglund . |

FLOW CONTROL VALVE HAVING FLOW ADJUSTABLE BY VARIABLE RING

CROSS-REFERENCE TO RELATED APPLICATIONS

This application is a continuation-in-part of U.S. patent application Ser. No. 08/069,459 filed Jun. 1, 1993, entitled "Flow Control Valve Having Adjustable Piston for Varying Flow Rate", now U.S. Pat. No 5,301,713.

BACKGROUND OF THE INVENTION

The present invention relates to constant fluid flow regulators and more particularly to a flow regulator having a spring biased piston and being capable of maintaining a constant fluid flow rate in both high pressure, low volume and low pressure, high volume environments with changes in inlet or outlet pressure. The present invention also accommodates high pressure, high volume and low pressure, low volume systems. Prior art constant fluid flow regulators vary fluid flow through the piston by movement of the piston that varies the flow pressure through this piston or by change in the spring tension. In contrast, the present invention varies fluid flow by varying the flow passage through or around the piston. More specifically, constant fluid flow regulators taught in prior art regulate fluid flow by adjustment screws that directly vary spring tension by attachment to the piston spring itself. Other regulators change fluid flow by altering piston position via springs and ball bearings located over the piston. The system employing springs and ball bearings is subject to extreme torque due to the fluid pressure in the chamber.

Also, prior art constant fluid flow regulators capable of accommodating low pressure, high volume fluid flow often employ sliding sleeves for opening and closing parts of the regulators. Additionally, multiple poppet type valves may be used for low pressure, high volume fluid flow regulation. The above prior art, however generally cannot accommodate high pressure, low volume fluid flow. This invention, on the other hand, is able to provide constant fluid flow in high or low pressure and high or low volume ranges. The present invention is also different from the above sliding sleeve and multiple poppet type valves in that the piston of the valves of the prior art move relative to the valve body to vary fluid flow as the pressure changes, while the piston of the present invention does not move substantially relative to the valve body after fluid flow has stabilized. Instead, constant spring force on the piston in the present invention allows constant flow with changing pressure. The present invention thus experiences less wear and tear from moving parts.

Additionally, U.S. Pat. No. 4,893,649 issued to Skoglund and U.S. Pat. No. 3,958,596 issued to Gerrard both disclose valves in which fluid flow variation is implemented by an adjustable valve seat. Adjustment of the valve seat adjusts the spring tension, which in turn alters the pressure differential across the piston. However, both of the above prior art patents employ threaded, screw-type mechanisms for adjusting the valve seat which are difficult to operate, have a narrow operating range, and are prone to breakage in high pressure environments.

Also, the screw-type valve seat adjustment mechanisms of the above prior art references both impede fluid flow through the valve. U.S. Pat. No. 4,893,649, discloses a valve in which the fluid outlet is oriented perpendicular to the fluid inlet in order to accommodate the valve seat adjustment mechanism. This angled fluid flow pathway results in a more complex valve design as well as increased fluid turbulence and higher pressure drops. U.S. Pat. No. 3,958,596 issued to Gerrard teaches a valve in which the fluid outlet passes axially through the valve seat adjustment screw. This valve seat adjustment mechanism configuration is difficult to use while the valve is in operation. The valve of the present invention, on the other hand, adjust fluid flow by varying fluid flow through or around the piston.

SUMMARY OF THE INVENTION

The present invention provides a mechanism for automatically maintaining a uniform rate of fluid flow through a flow channel under varying pressures from fluid sources. In accordance with the present invention, a valve body has an inlet port and a single outlet port through the valve body and preferably axially aligned. A bore is located within the valve body. A piston is disposed within the bore and is biased with a spring or springs. The piston divides the bore into two chambers. The flow path through the valve mechanism is an orifice through the piston and/or a fluid pathway around the piston.

The piston is initially spring biased towards the top portion of the valve. Fluid flowing into the controller valve via the inlet port increases the pressure in the chamber above the piston, forcing the piston toward the valve seat. The piston is thus seated in the valve seat, blocking fluid flow to the outlet port. The pressure in the chamber below the piston builds until the pressure force in this lower chamber plus the piston spring force is greater than the pressure force in the chamber above the piston. The piston then lifts from the valve seat, and the pathway to the outlet orifice is opened. Fluid flows through the piston via the piston orifice and/or the pathway around the piston. An equilibrium flow rate is reached (i.e., when the pressure forces in the upper chamber equals the pressure forces in the lower chamber plus the spring force) by variation in the piston position based on the interaction of the above fluid pressure forces and spring force.

After the desired flow rate has been attained, the piston no longer moves substantially relative to the valve body. Instead, constant flow rate is maintained despite pressure changes because the spring force maintains a constant pressure differential pressure between the two valve chambers.

To adjust fluid flow through the valve, fluid flow either around the piston or through the piston orifice is varied by a bladder ring which is inflated or deflated, by an elastomeric ring which is compressed by liquid or structural forces, or by a metal or plastic ring that is circumferentially variable by mechanical actuators.

DESCRIPTION OF THE DRAWINGS

A more complete appreciation of the invention may be had by reference to the accompanying drawing illustrating a preferred embodiment of the invention to be described in detail, wherein.

DESCRIPTION OF THE PREFERRED EMBODIMENT

The novel features believed to be characteristic of this invention are set forth in the appended claims. The invention itself, however, may best be understood and its various objects and advantages best appreciated by reference to the detailed description below in connection with the accompanying drawings.

Figure 1:
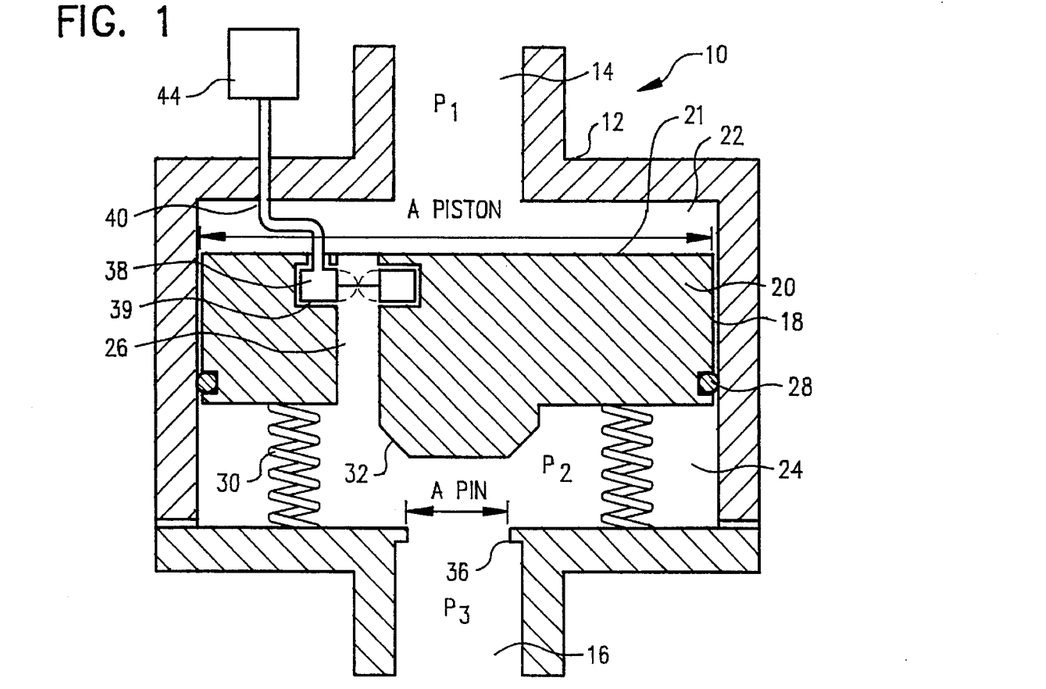
FIG. 1 is a cross-sectional view of a first embodiment of the present invention.
Figure 21:
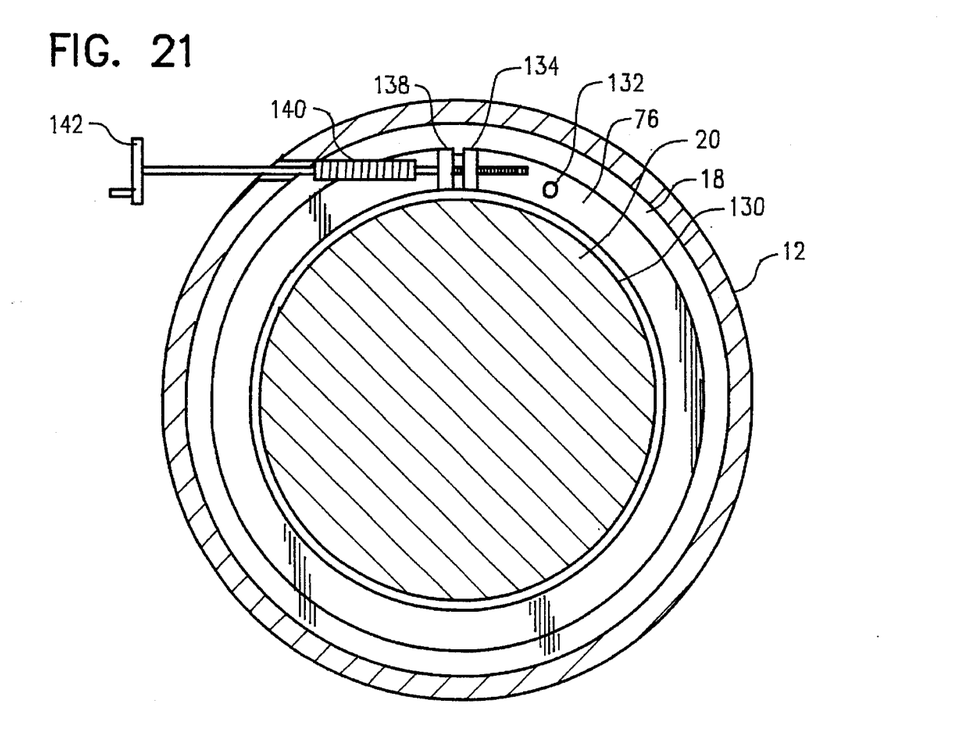
FIG. 21 is a top view of the fifteenth embodiment of the present invention.

Referring to the FIGS. 1 and 21, the reference numeral 10 indicates the constant flow rate controller valve, as a whole. Valve 10 has a valve body 12 having at its top portion an inlet port 14, and having at its bottom portion an outlet port 16 which are preferably axially aligned. A bore 18 is formed within valve body 12; the bore 18 is defined by an elongated cylinder of decreased diameter at its lower portion.

A piston 20 having a head 21 is disposed within bore 18 such that a portion of bore 18 is divided into chamber 22 above piston head 21 and chamber 24 below piston 20. Piston 20 is of a generally cylindrical configuration. Chambers 22 and 24 may be sized to be of relatively small area to minimize the amount of "fluid packing" in the invention. "Fluid packing" relates to the amount of fluid in the valve. If less flow is present in the valve, fluid compressibility will not delay the response time of the valve to pressure fluctuations.

The flow path through the constant flow rate controller valve 10 is a flow path through or around the piston 20. When this flow path is within piston 20, it may be an orifice 26 that permits the flow of fluid from chamber 22 through piston 20 and into chamber 24. Variation of the effective size of orifice 26 allows the fluid flow through valve 10 to be altered, as discussed below in further detail. Alternatively, the flow path is around piston 20 between the inner walls of body 12 and the outer walls of piston 20. Variation of the effective size of this flow path allows the fluid flow to be altered, as discussed below.

In order to prevent fluid flow around the periphery of piston 20 when this invention is employed in high fluid pressure environments, seal 28 is placed around the periphery of piston 20. Seal 28 is preferably a cup or diaphragm seal.

Within chamber 24 are springs 30 which contact piston 20 and bias piston 20 upwardly toward chamber 22. Springs 30 may be a coil type spring for example. By employing coil type springs for springs 30, the desired flow rate may be conveniently altered by changing the flow area through orifice 26 around the piston. By altering this free flow area, the $C_v$ (flow resistance) changes, thus altering the flow Q ($Q = C_v \sqrt{\Delta P/sg}$). The differential pressure across the piston stabilizes after the $C_v$ change. The valve is then pressure independent at the new flow setting.

Piston pin 32 is a relatively narrowed cylindrical structure located on the bottom portion of piston 20. The bore 18 forming chamber 22 and 24 is sized such that the diameter of bore 18 below chamber 24 (outlet port 16) is substantially narrower than the portions of bore 18 forming chambers 22 and 24. This narrowed portion of bore 18 (outlet port 16) is sized to accommodate piston pin 32. As piston 20 is forced toward valve seat 36 and outlet port 16, the fluid pressure forces in chamber 22 are greater than the fluid pressure forces and the spring force in chamber 24.

The constant flow rate controller valve 10 operates based on the following force balance equations.

$$P_1 A_{piston} = P_2(A_{piston} - A_{pin}) + KX + P_3 A_{pin}$$

Where
$P_1$=pressure in chamber 22
$A_{piston}$=surface area of piston 20
$P_2$=pressure in chamber 24
$KX$=spring force of springs 30
$A_{pin}$=surface area of piston pin 32 which mates with seat 36
$P_3$=pressure at outlet port 16

Rearrangement of terms produces the following equations:

$$P_1 A_{piston} = P_2 A_{piston} - P_2 A_{pin} + KX + P_3 A_{pin}$$

$$(P_1 - P_2) A_{piston} = KX - P_2 A_{pin} + P_3 A_{pin}$$

$$\Delta P = P_1 - P_2 = \frac{KX - P_2 A_{pin} + P_3 A_{pin}}{A_{piston}}$$

Because $A_{pin}$ is small in comparison to $A_{piston}$, and assuming $P_3$ equals the flow pressure at outlet port 16, the following equations characterize the force balance existing in the present invention.

$$KX = (P_1 - P_2) A_{piston} + P_2 A_{pin} - P_3 A_{pin} \text{ ($P_2 A_{pin}$ and $P_3 A_{pin}$ being relatively small in size)}$$

$$KX = (P_1 - P_2) A_{piston}$$

Thus, the differential pressure $(P_1 - P_2)$ is a function of spring force (KX).

The flow rate of water, for example, through the constant flow rate controller valve 10 is defined by the following equation:

$$Q = C_v \sqrt{\Delta P / sg}$$

Where
$\Delta P = P_1 - P_2$
Q=flow rate
$P_1$=pressure in chamber 22
$P_2$=pressure in chamber 24
$C_v$=flow resistance across orifice 26
Sg=Specific gravity of fluid Note that because differential pressures ($P_1 - P_2$) is a function of spring force (KX), flow rate (Q) is also a function of spring force. Thus, the constant flow rate controller valve 10 has a constant flow as long as spring force remains constant. This flow is constant regardless of the flow pressure at inlet port 14. Theoretically, there is a pressure force exerted on the piston pin 32 which mates with seat 36 and against the remainder of piston 20 defined by $P_3 \bullet A_{pin}$
Where
$P_3$=pressure at outlet port 16
$A_{pin}$=surface area of piston pin 32

However, the above force is small due to the small surface are of piston pin 32 when compared to the surface area of piston 20 as a whole. Thus, flow rate is relatively constant regardless of the flow pressure at outlet port 16. Note that this force would not be small and the flow rate would not be constant if, in the present invention, the area of piston pin 32 was not small in value when compared to the surface area of piston 20 as a whole.

The constant flow rate controller valve 10 operates as follows. Fluid passes through inlet port 14 and enters chamber 22. Piston 20, which is biased by springs 30 towards chamber 22, is pushed toward chamber 24 by the increased pressure in chamber 22, thus seating piston pin 32 in valve seat 36. The seating of piston pin 32 in valve seat 36 blocks flow to outlet port 16. Chamber 24 is thus sealed.

Fluid flows from chamber 22 into chamber 24 via orifice 26, or between the inner walls of body 12 and the outer walls of piston 20, and the flow pressure force in chamber 24 increases. When the flow pressure forces in chamber 24 plus the spring force of spring 30 exceeds forces caused by the pressure in chamber 22, piston 20 is pushed towards chamber 22 and is unseated from valve seat 36 and fluid flow begins. A piston equilibrium position is next attained when the forces on the piston in chamber 22 equals the forces on the piston (which includes the spring force on spring 30) in chamber 24.

The above piston equilibrium position also provides the desired flow rate, the desired flow rate being set by varying the variable orifice area around or through piston 20, which in turn changes the flow resistance $C_v$. Without further substantial change in the position of piston 20, the flow rate will remain constant despite flow pressure changes because the spring force of springs 30 maintains a constant pressure differential between chamber 22 and chamber 24 and orifice 26.

The variation of fluid flow through orifice 26 or between the inner walls of body 12 and the outer walls of piston 20 will now be described in detail.

Figure 2:
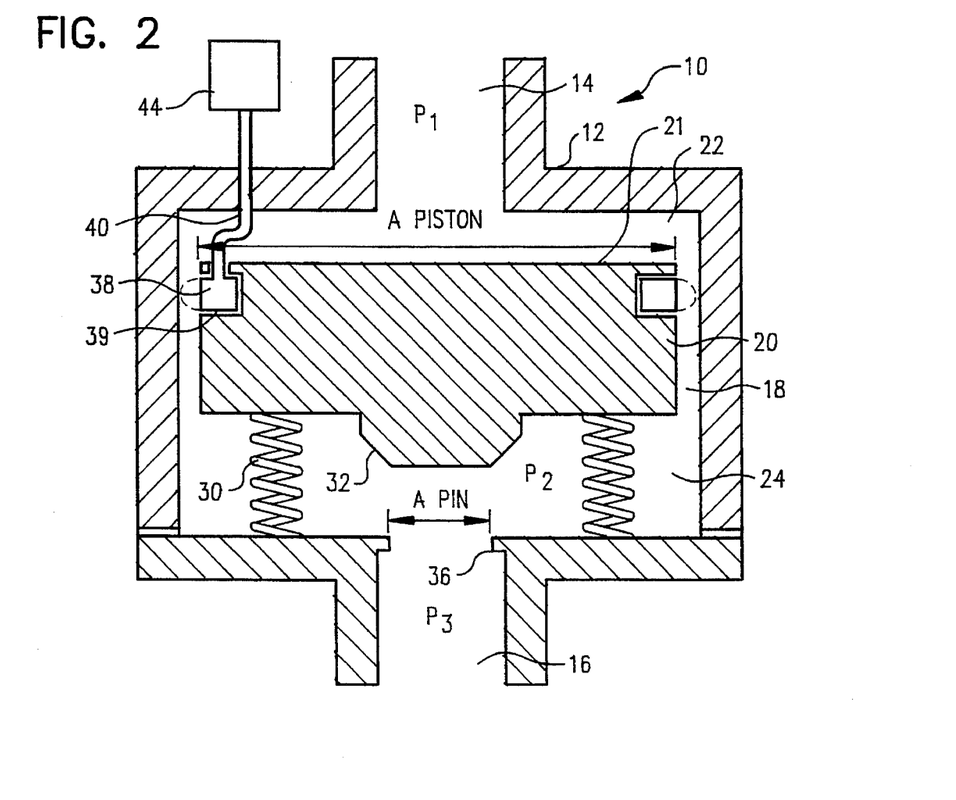
FIG. 2 is a cross-sectional view of a second embodiment of the present invention.
Figure 3:
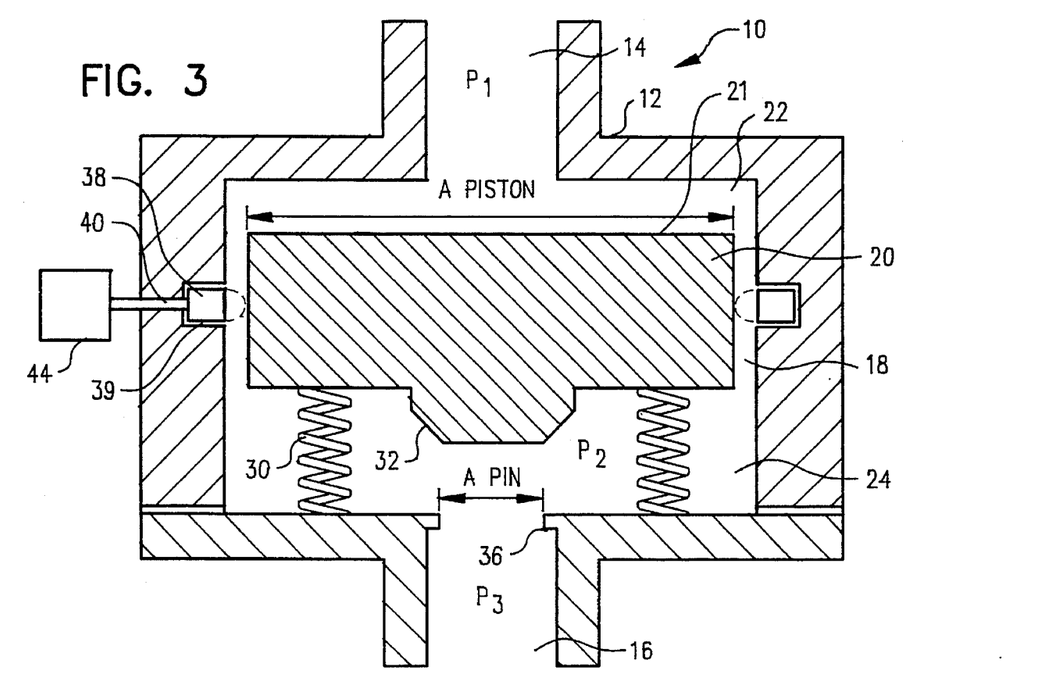
FIG. 3 is a cross-sectional view of a third embodiment of the present invention.

Referring to FIGS. 1–3, a ring-shaped inflatable bladder 38 is circumferentially disposed in recess 39 around orifice 26 (FIG. 1), the outer walls of piston 20 (FIG. 2), or the inner walls of body 12 (FIG. 3). Inflatable bladder 38 is preferably comprised of a resilient natural or synthetic polymer such as, for example, SBR rubber, polychloroprene, EPDM, or neoprene. Fluid line 40 connects inflatable bladder 38 to fluid source 44. Fluid source 44 provides pressurized fluid, such as, for example, air, oxygen, or water, to inflatable bladder 38. The increased pressure within inflatable bladder 38 results in expansion of inflatable bladder 38. Inflatable bladder 38 can only expand in one direction, i.e. into orifice 26 (FIG. 1) or into the flow path between the inner walls of body 12 and the outer walls of piston 20 (FIGS. 2 and 3) because inflatable bladder 38 is fitted with the aforesaid recess 39. As the circumference of inflatable bladder 38 is increased or decreased based on the pressure in inflatable bladder 38, as regulated by fluid source 44, fluid flow through the orifice 26 or between the inner walls of body 12 and the outer walls of piston 20 is varied.

Figure 4:
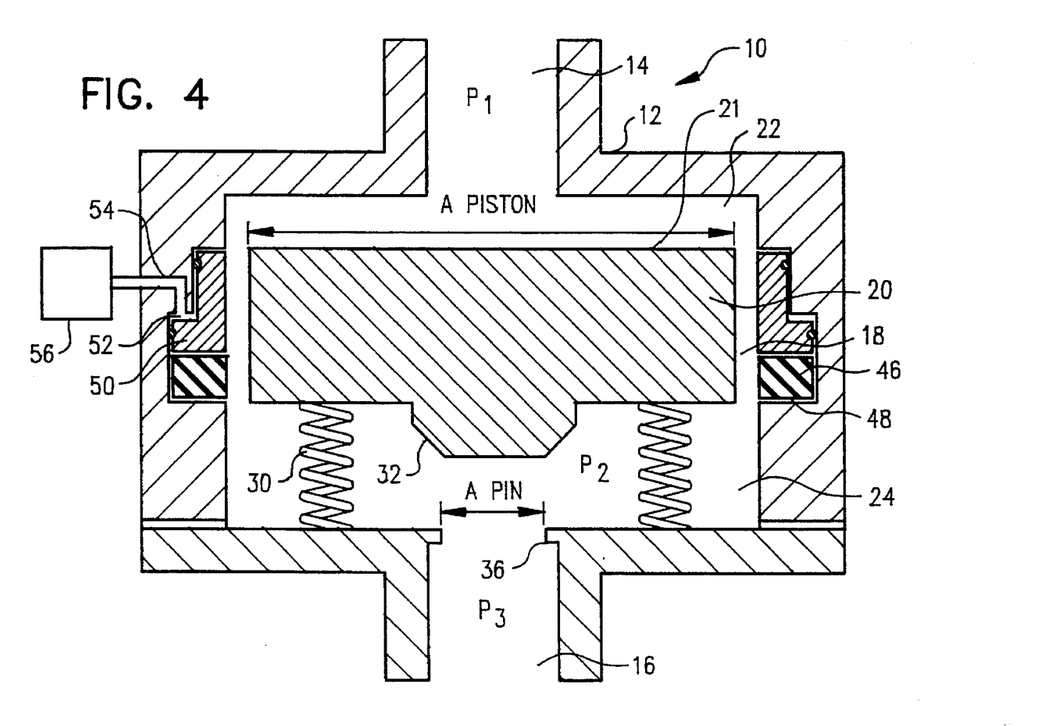
FIG. 4 is a cross-sectional view of a fourth embodiment of the present invention.
Figure 5:
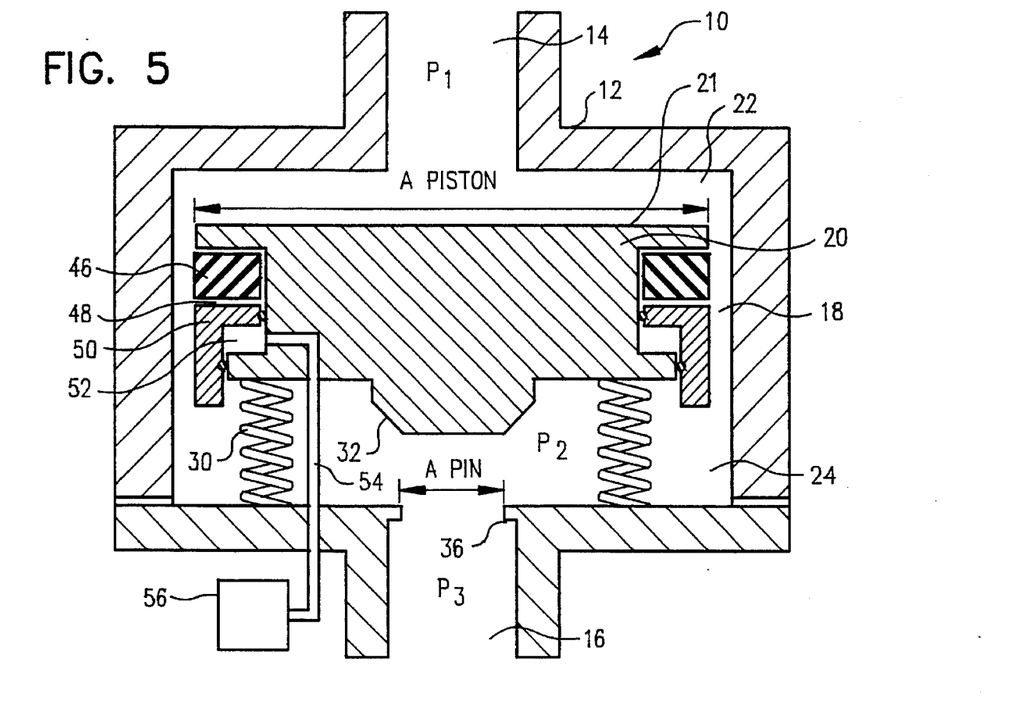
FIG. 5 is a cross-sectional view of a fifth embodiment of the present invention.
Figure 6:
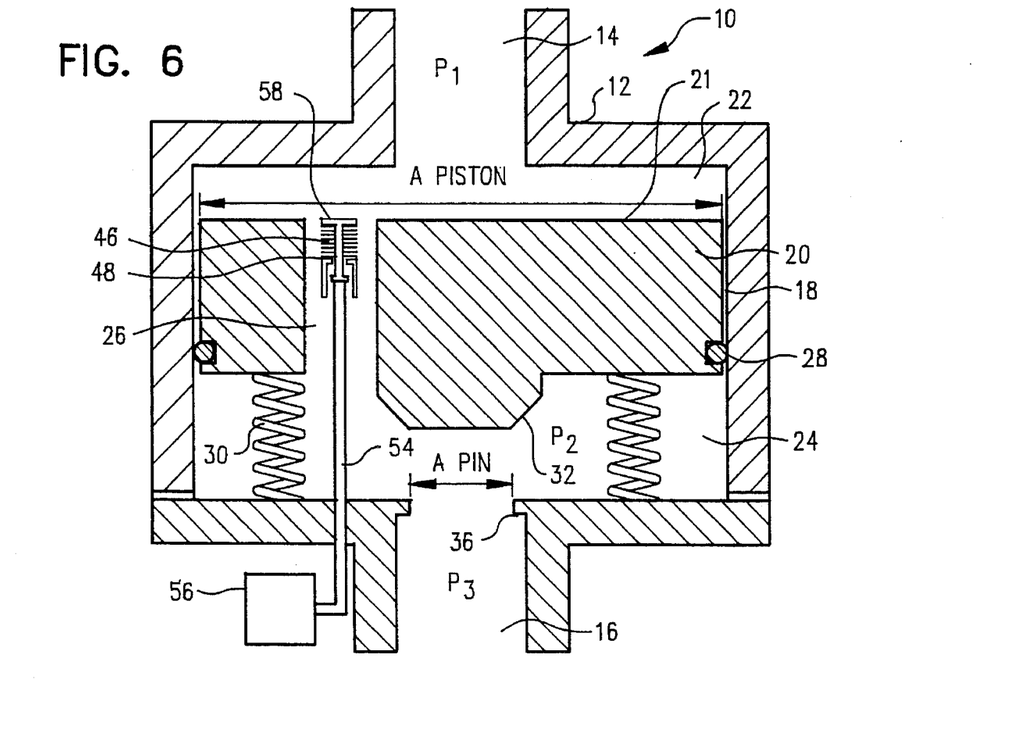
FIG. 6 is a cross-sectional view of a sixth embodiment of the present invention.
Figure 7:
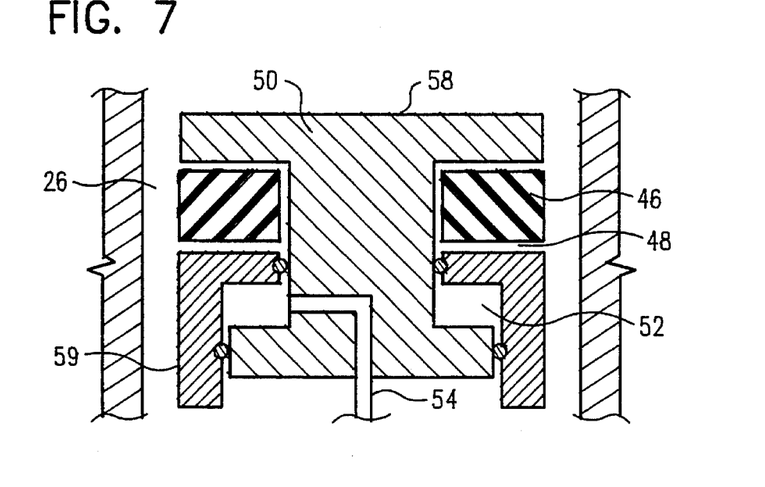
FIG. 7 is a detailed cross-sectional view of a sixth embodiment of the FIG. 6.
Figure 9:
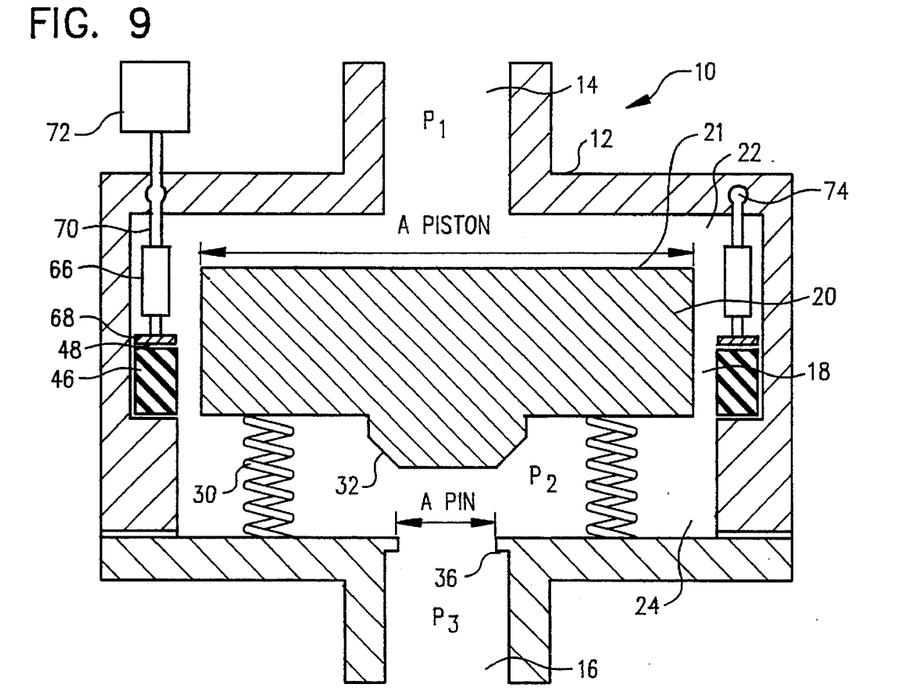
FIG. 9 is a cross-sectional view of the eighth embodiment of the present invention.
Figure 10:
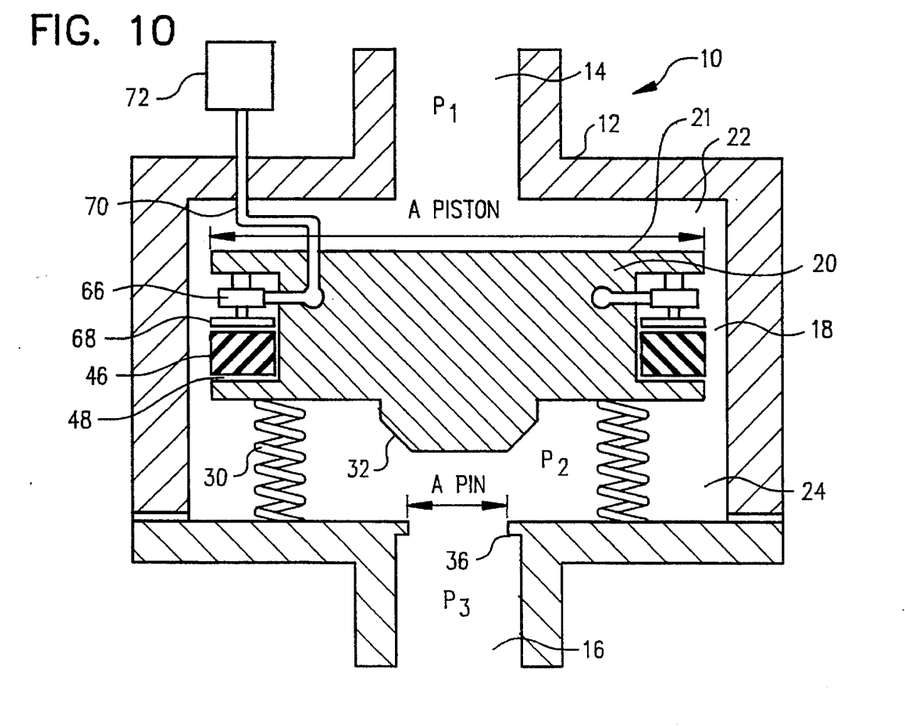
FIG. 10 is a cross-sectional view of the ninth embodiment of the present invention.
Figure 11:
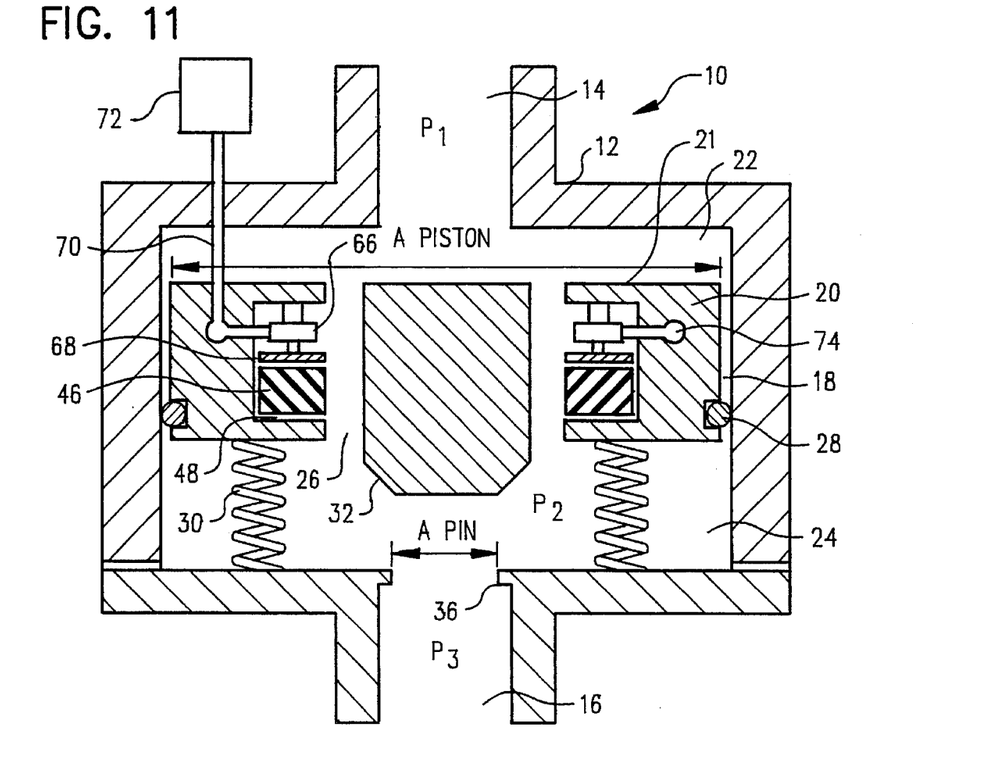
FIG. 11 is a cross-sectional view of the tenth embodiment of the present invention.

Now referring to FIGS. 4 through 11, elastomer ring 46 is circumferentially disposed in a recess 48 around the inner walls of body 12 (FIGS. 4, 8 and 9), the outer walls of piston 20 (FIGS. 5 and 10), or around orifice 26 (FIGS. 6, 7 and 11). Elastomer ring 46 is preferably comprised of SBR rubber, polychloroprene, EPDM, or neoprene. Elastomer ring 46 is thus a compressible elastic material. Elastomer ring 46 is compressed in width in ways described in further detail below such that the circumference of elastomer ring 46 increases. Elastomer ring 46 can only increase circumferentially into the flow path between the inner walls of body 12 and the outer walls of piston 20 (FIGS. 4, 5, 8, 9 and 10) or into the flow path in orifice 26 (FIGS. 6, 7 and 11) because elastomer ring 41 is fitted in recess 48. As the circumference of elastomer ring 48 is either increased or decreased as the width of elastomer ring 48 conversely decrease or increases, fluid flow through orifice 26 or between the inner walls of body 12 and the outer walls of piston 20 is varied.

In FIGS. 4 through 7, the width of elastomer ring 46 is compressed to increase the circumference thereof by means of compression member 50. Compression member 50 is pressed onto the external surface of elastomer ring 46 to compress the width of elastomer ring 46. A fluid reservoir 52 adjacent compression member 50 communicates via fluid line 54 with fluid source 56. Fluid source 56 contains pressurized fluid such as air, oxygen or water. As pressurized fluid from pressure source 56 increases the fluid pressure within fluid reservoir 52, compressor member 50, which is movable relative to piston 20 or body 12, is forced to press onto elastomer ring 46, thus compressing the width and increasing the circumference of elastomer ring 46. As shown in FIGS. 4 and 5, compressor member 50 may be an annular member. Alternatively, as shown in FIGS. 6 and 7, compressor member may be comprised of a piston 58 which moves relative to a stationary base member 59.

Figure 8:
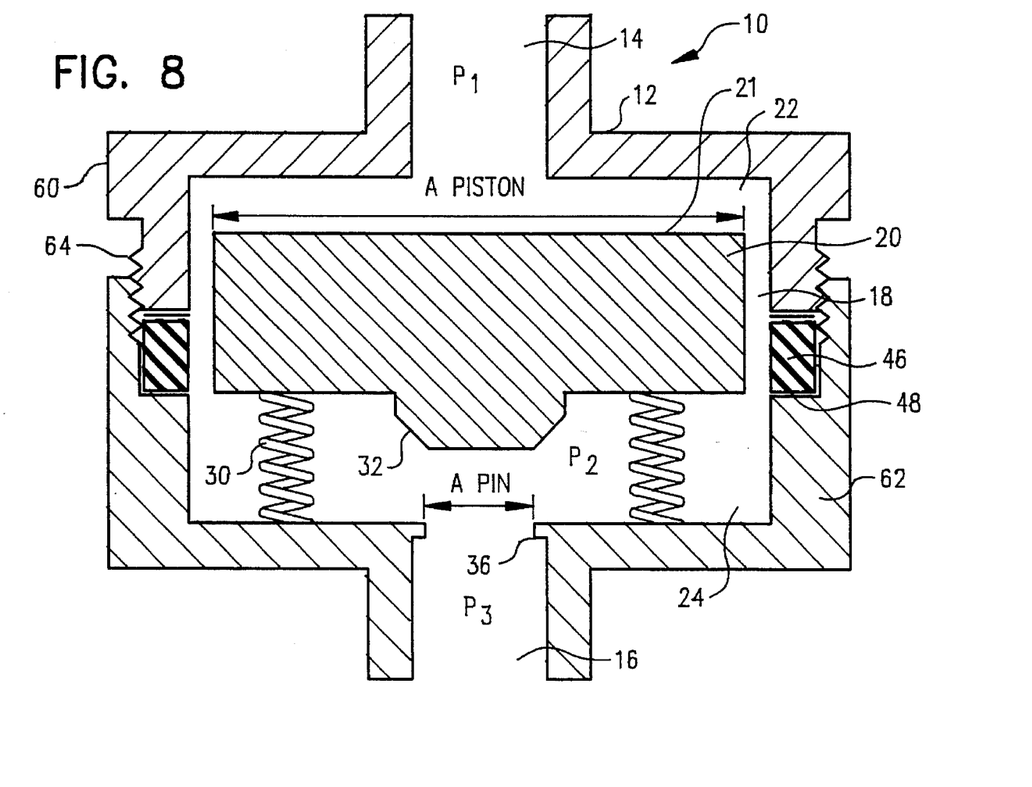
FIG. 8 is a cross-sectional view of the seventh embodiment of the present invention.

Referring now to FIG. 8, elastomer ring 46 can be compressed in width to increase its circumference by means of relative movement of top portion 60 of body 12 with respect to bottom portion 62 of body 12. Top portion 60 and bottom portion 62 are threadedly engaged by threads 64 such that the relative longitudinal dimension of body 12 can be varied. The longitudinal dimension of body 12 is decreased as top portion 60 is screwed into bottom portion 62, and the width of elastomer ring 46 is decreased and the circumference is increased to alter fluid flow as top portion 60 presses onto the exterior surface of elastomer ring 46.

Now referring to FIGS. 9 through 11, elastomer ring 46 can be compressed in width to increase its circumference by means of fluid pistons 66. Fluid pistons 66 press compression plate 50 against the exterior surface of elastomer ring 46 to compress elastomer ring 46 against the walls forming recess 48.

One of fluid pistons 66 is connected via fluid line 70 to fluid source 72, which contains pressurized fluid such as air, oxygen or water. The remaining fluid pistons 6 are connect to fluid line 70 by manifold 74.

One of fluid pistons 66 is connected via fluid line 70 to fluid source 72, which contains pressurized fluid such as air, oxygen or water. The remaining fluid pistons 66 are connected to fluid line 70 by manifold 74.

Figure 12:
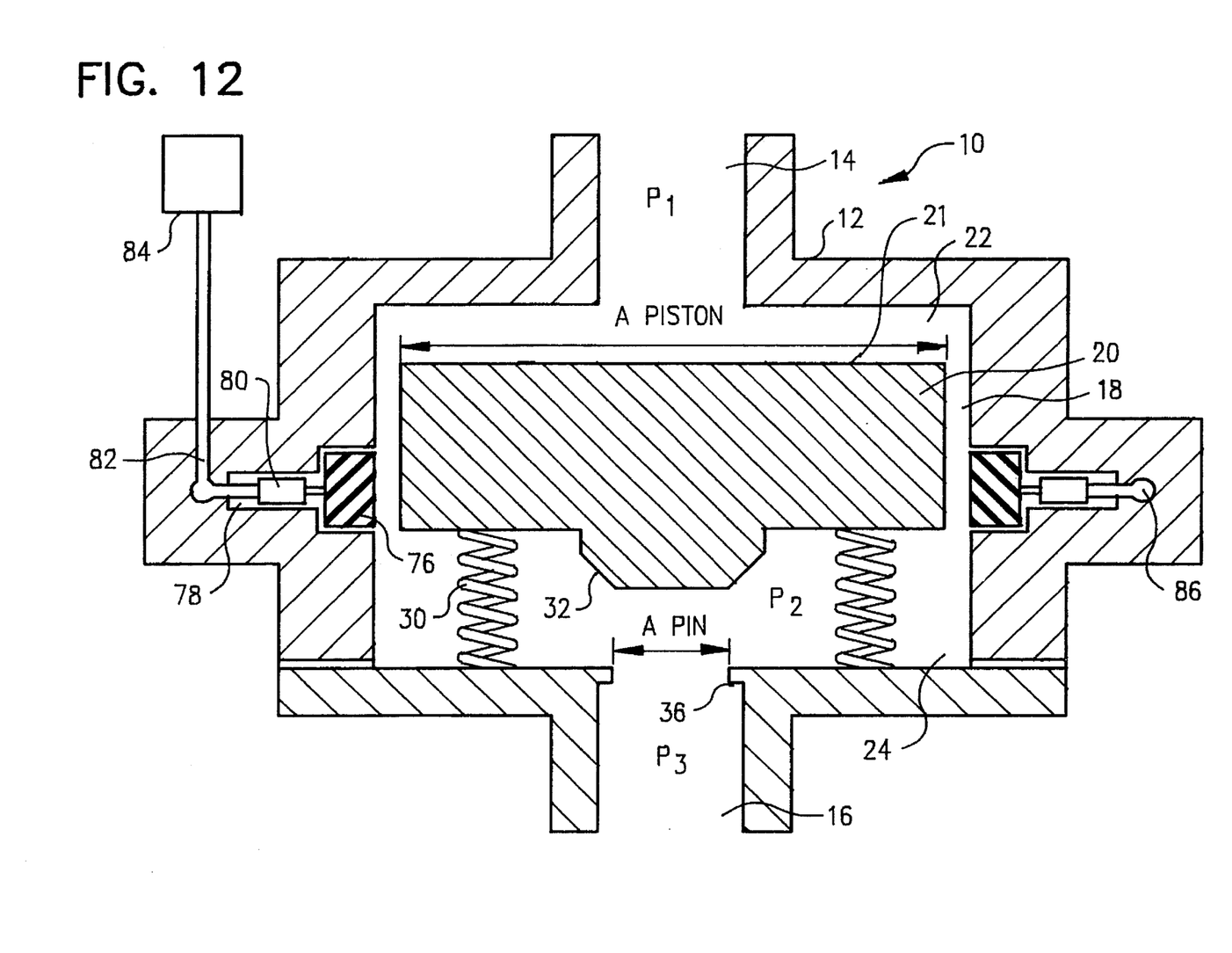
FIG. 12 is a cross-sectional view of the eleventh embodiment of the present invention.
Figure 13:
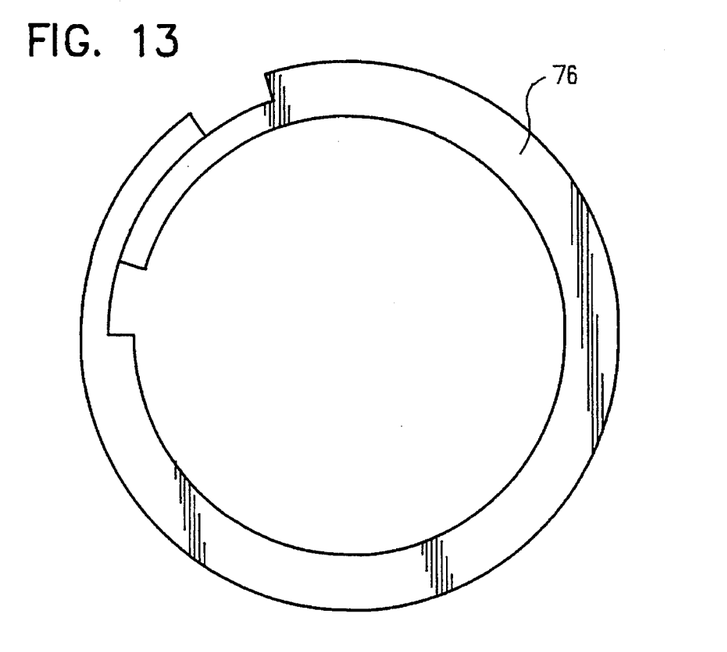
FIG. 13 is a top view of the split ring of the eleventh embodiment of FIG. 12.
Figure 15:
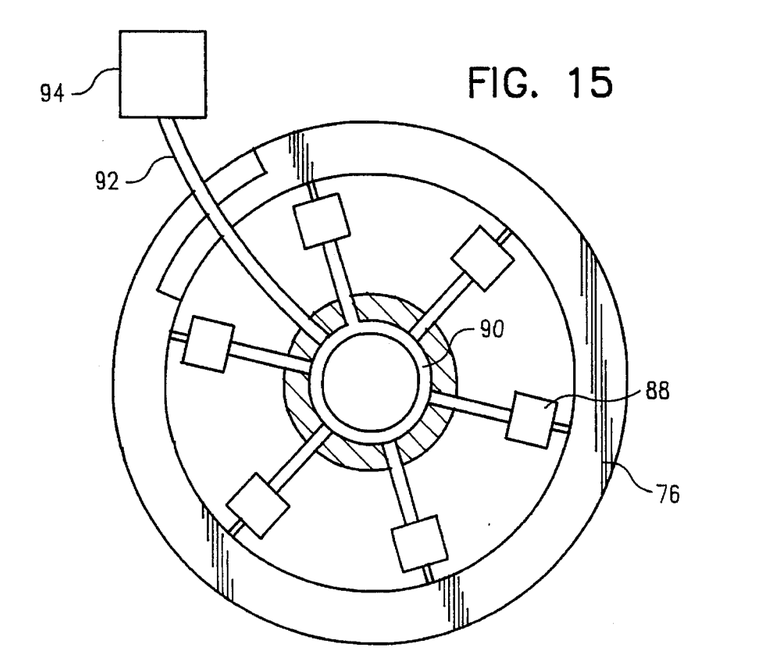
FIG. 15 is a top view of a first piston mechanism of the twelfth embodiment of FIG. 14.
Figure 16:
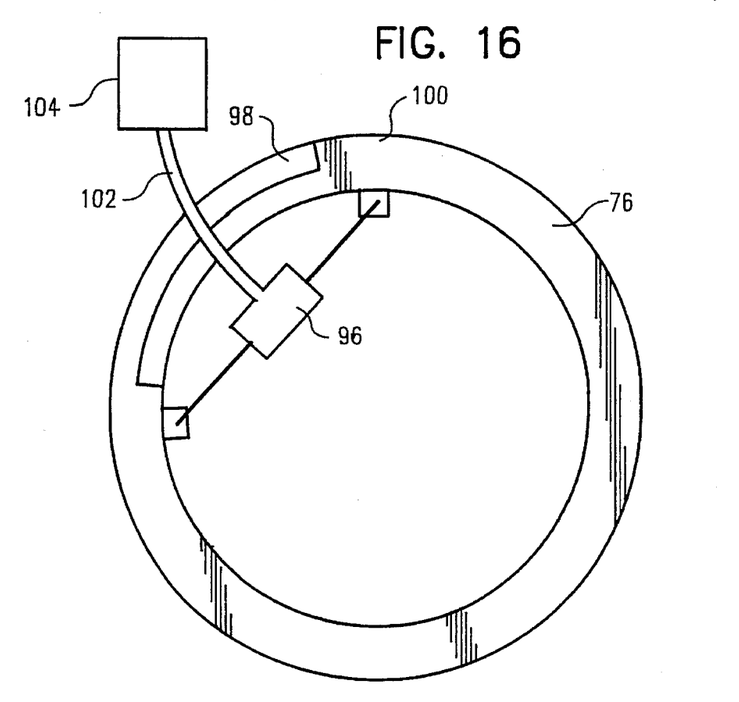
FIG. 16 is a top view of a second piston mechanism of the twelfth embodiment of FIG. 14.
Figure 17:
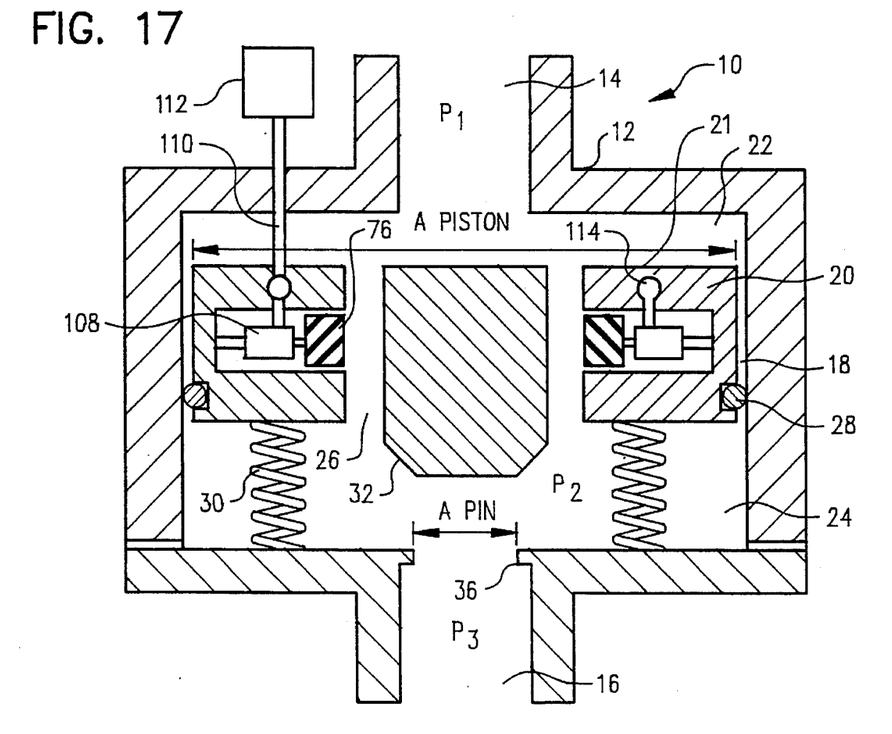
FIG. 17 is a cross-sectional view of the thirteenth embodiment of the present invention.

Now referring to FIGS. 12 through 21 circumferentially alterable ring 76 is employed to vary fluid flow through the flow path between the inner walls of body 12 and the outer walls of piston 20 (FIGS. 12 through 16 and 18 through 21) or through the flow path in orifice 26 (FIG. 17). Ring 76 is preferably substantially rigid, but can be circumferentially varied. Ring 76 is preferably comprised of a metal alloy such as stainless steel, steel, or brass; or a polymer such as rubber, EPDM, or polychloroprene that returns to its original configuration after being circumferentially altered. Ring 76 can be an uninterrupted ring, or may be a split ring as shown in FIG. 13. When split, one end of ring 76 can be secured to body 12 or piston 20, or both ends may be free. The circumference of ring 76 is varied in the manners described below.

Referring specifically to FIGS. 12 and 13, ring 76 is located in recess 78 of body 12. Fluid pistons 80 are also located in recess 78. Fluid pistons 80 are radially disposed around, and contact, the outer circumference of ring 76 to force ring 76 toward the outer wall of piston 20 to alter fluid flow. One of fluid pistons 80 is connected via fluid line 82 to fluid source 84, which contains pressurized fluid such as air, oxygen or water. The remaining fluid piston 80 are connected to fluid line 82 by manifold 86.

Figure 14:
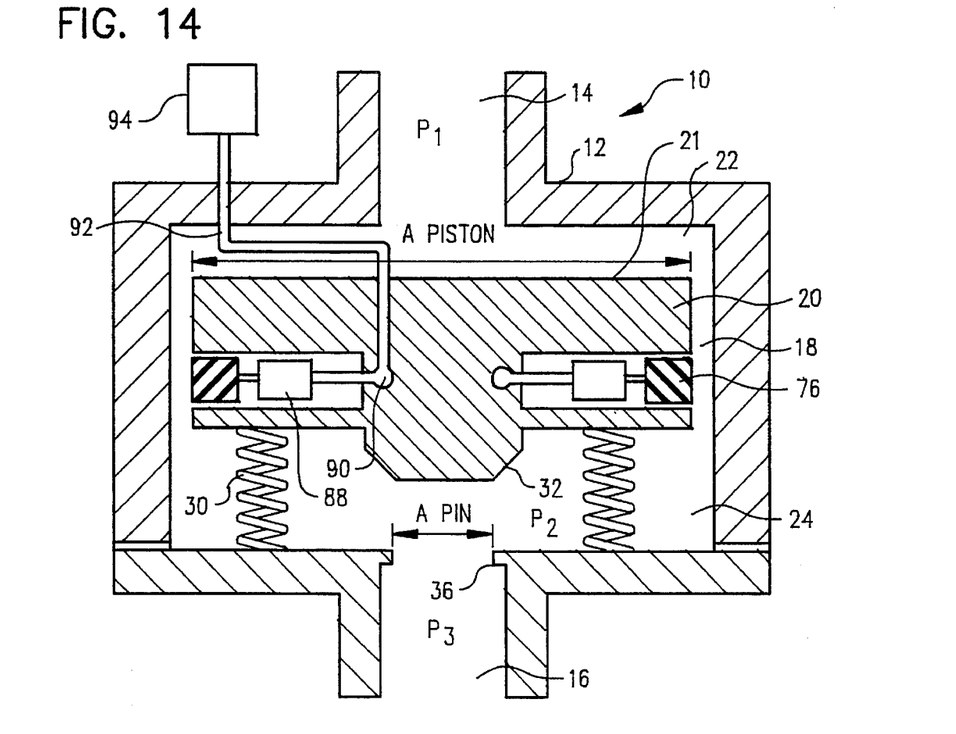
FIG. 14 is a cross-sectional view of the twelfth embodiment of the present invention.

Referring to FIGS. 14 through 16, fluid pistons 88 and ring 76 are located on top of piston 20. As shown in FIGS. 14 and 15, fluid pistons 88 can be radially disposed within and contacting the inner circumference of ring 76 to force ring 76 toward the inner wall of body 12 to alter fluid flow. Pistons 88 are connected to manifold 90 which, in turn, communicates with fluid line 92. Fluid line 92 is connected to fluid source 94, which contains pressurized fluid such as air, oxygen or water.

Alternatively, as shown in FIG. 16, a single piston 96, attached to the two split ends 98 and 100, of ring 76 can be employed to alter the circumference of ring 76 to vary fluid flow. Piston 96 is connected to fluid line 102 which, in turn communicates with fluid source 104. Fluid source 104 contains pressurized fluid such as air, oxygen or water.

Referring to FIG. 17, ring 76 is located in recess 106 of piston 20 and around orifice 26. Fluid pistons 108 are radially disposed around, and contact, the outer circumference of ring 76 to force ring 76 toward orifice 26 to alter fluid flow. One of fluid pistons 108 is connected via fluid line 110 to fluid source 112, which contains pressurized fluid such as air, oxygen or water. The remaining fluid pistons 88 are connect to manifold 114.

Figure 18:
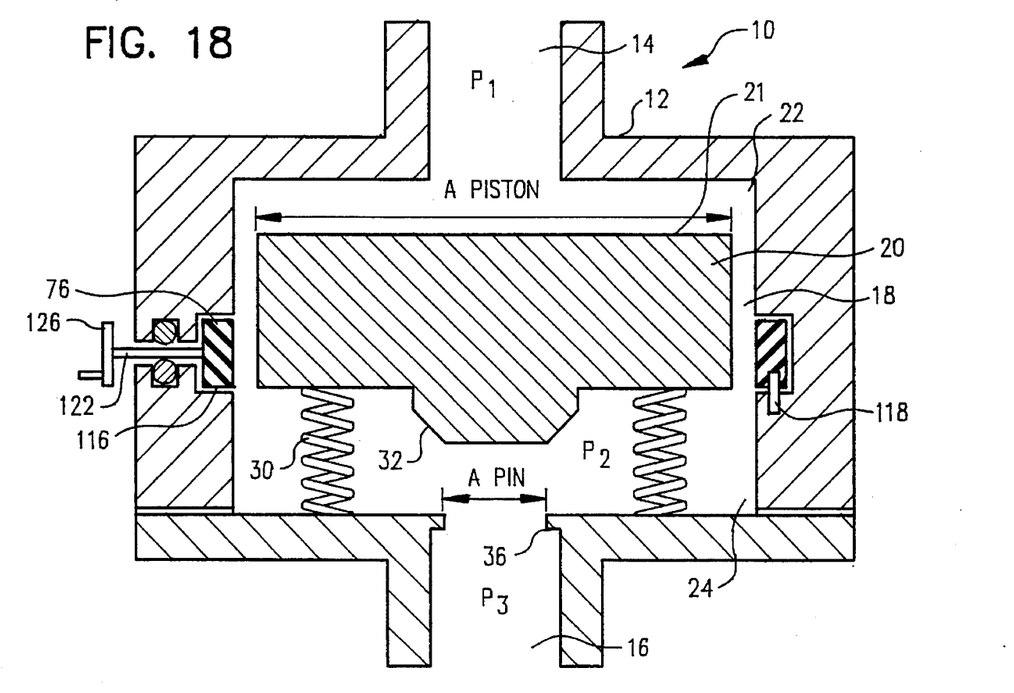
FIG. 18 is a cross-sectional view of the fourteenth embodiment of the present invention.
Figure 19:
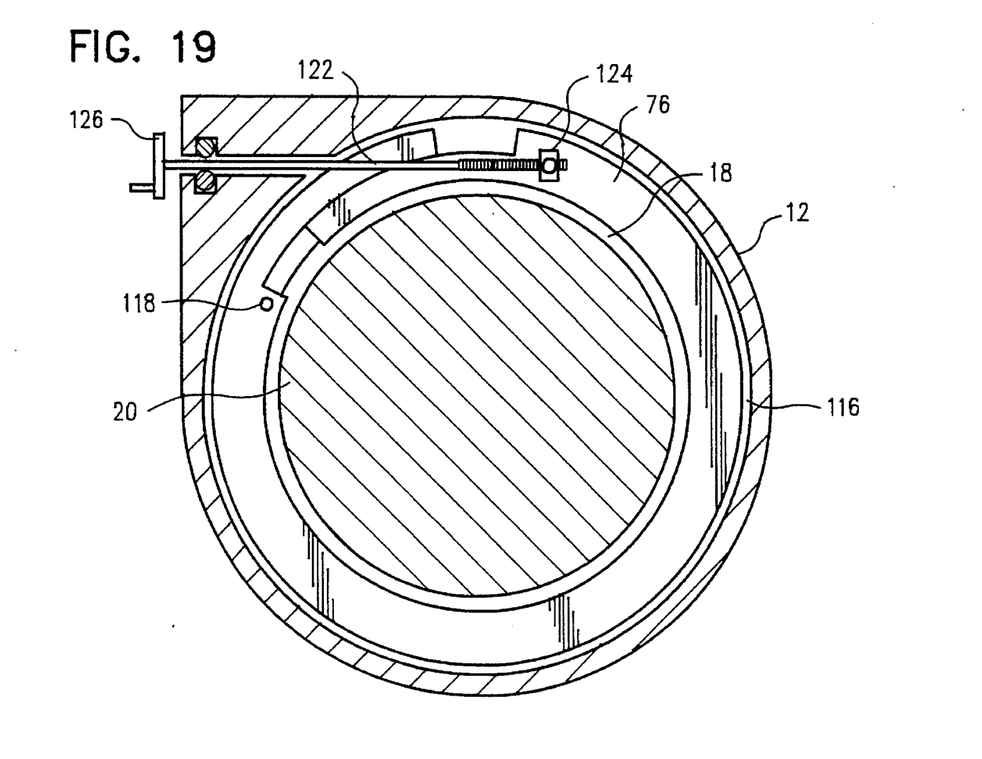
FIG. 19 is a top view of the fourteenth embodiment of the present invention.

Referring to FIGS. 18 and 19, ring 76 is located in recess 116 of body 12. Ring 76 is a split ring having end 118 fixedly secured to body 12 by, for example, bolt 120. Flange 124 is pivotally attached to one of shaft 122 and ring 76, and is fixedly connected to the other of shaft 122 and ring 76. Shaft 122 is threadedly connected to nut 126. As shaft 122 is rotated by turning handle 126, the threaded connection between shaft 122 and nut 126 moves shaft 122 relative to nut 126. This movement of shaft 122 moves end 118 of ring 76 due to the connection of flange 124 to ring 76 and to shaft 122, thus altering the circumference of ring 76 to vary the fluid flow between the inner walls of body 12 and the outer walls of piston 20.

Figure 20:
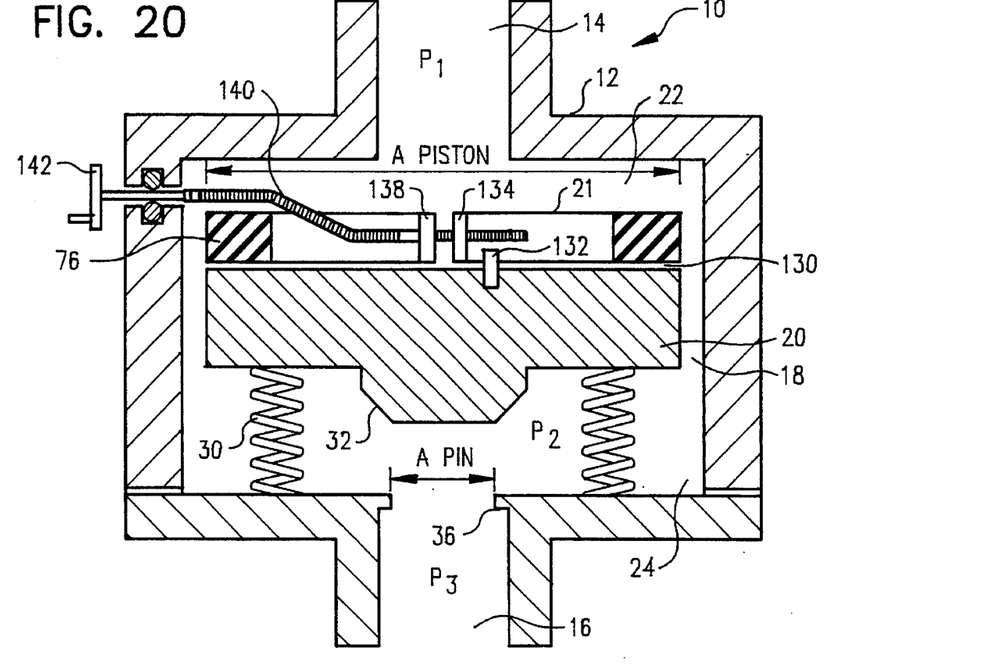
FIG. 20 is a cross-sectional view of the fifteenth embodiment of the present invention.

Referring to FIGS. 20 and 21, ring 76 is located on top of piston 20. Ring 76 is a split ring having end 130 fixedly secured to piston 20 by, for example, bolt 132. Flanges 134 and 138 are located on ends 130 and 136, respectively, of ring 76. Flexible shaft 140 threadedly passes through flanges 134 and 138. As shaft 140 is rotated by turning handle 142, the threaded connection between shaft 140 and flanges 134 and 138 moves free end 136 of ring 76 relative to fixed end 130 of ring 76, thus altering the circumference of ring 76 to vary the fluid flow between the inner walls of body 12 and the outer walls of piston 20.

While particular embodiments of the present invention have been described in some detail above, changes and modifications may be made in the illustrated embodiments without departing from the form or spirit of the invention. It is therefore intended that following claims cover all equivalent modifications and variations as fall within the scope of the invention as defined by the claims.

I claim:

1. A valve comprising:

a housing having an inlet and outlet defining a flow passage through said housing, divided into a first chamber and a second chamber, and having an inner wall;

a piston mounted in a bore in said flow passage, said piston having an outer wall and cooperating with said outlet to alter the flow area through said outlet; spring means biasing said piston toward said inlet; and means encircling at least one of said inner wall of said housing and said outer wall of said piston and having an alterable cross-sectional area for altering fluid flow between said inner wall of said housing and said outer wall of said piston.

2. The valve of claim 1 wherein said means for altering fluid flow is on said inner wall of said housing.

3. The valve of claim 1 wherein said means for altering fluid flow is on said outer wall of said piston.

4. The valve of claim 1 wherein said means for altering fluid flow is an inflatable bladder.

5. The valve of claim 4 wherein said inflatable bladder is ring-shaped.

6. The valve of claim 4 wherein said inflatable bladder is inflated and deflated by a pressurized fluid source.

7. The valve of claim 1 wherein said means for altering fluid flow is a deformable elastomer.

8. The valve of claim 7 wherein said deformable elastomer is ring-shaped.

9. The valve of claim 7 wherein said elastomer is deformed by a pressurized fluid source.

10. The valve of claim 7 wherein said elastomer is deformed by piston means.

11. The valve of claim 7 wherein said housing is divided into a first portion and a second portion threadedly interconnected with said first portion, said elastomer being deformed by relative movement of a said first portion of said housing with respect to said second portion of said housing.

12. The valve of claim 1 wherein said means for altering fluid flow is a circumferentially variable ring.

13. The valve of claim 12 wherein said ring is unitary in construction.

14. The valve of claim 12 wherein said ring is split at one portion thereof.

15. The valve of claim 14 wherein said ring has one end secured to said valve.

16. The valve of claim 12 wherein the circumference of said ring is altered by piston means.

17. The valve of claim 12 wherein the circumference of said ring is altered by screw means.

18. A valve comprising:

a housing having an inlet and outlet defining a flow passage through said housing, divided into a first chamber and a second chamber, and having an inner wall;

a piston mounted in a bore in said flow passage, said piston having an outer wall and cooperating with said outlet to alter the flow area through said outlet;

spring means biasing said piston toward said inlet; and means for altering fluid flow between said inner wall of said housing and said outer wall of said piston, said means for altering fluid flow comprising an inflatable bladder adjacent one of said inner wall of said housing and said outer wall of said piston.

* * * * *